United States Patent
Lu et al.

(10) Patent No.: US 10,394,354 B2
(45) Date of Patent: Aug. 27, 2019

(54) ARRAY SUBSTRATE, TOUCH DISPLAY PANEL AND DISPLAY APPARATUS

(71) Applicants: Shanghai Tianma Micro-Electronics Co.,Ltd, Shanghai (CN); TIANMA MICRO-ELECTRONICS CO., LTD., Shenzhen (CN)

(72) Inventors: Feng Lu, Shanghai (CN); Xingyao Zhou, Shanghai (CN); Hong Ding, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 304 days.

(21) Appl. No.: 15/069,973

(22) Filed: Mar. 15, 2016

(65) Prior Publication Data
US 2016/0299612 A1 Oct. 13, 2016

(30) Foreign Application Priority Data
Apr. 9, 2015 (CN) .......................... 2015 1 0166454

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 2203/04103* (2013.01)

(58) Field of Classification Search
None
See application file for complete search history.

(56) References Cited

U.S. PATENT DOCUMENTS 7,859,521 B2  12/2010  Hotelling et al.
2010/0295819 A1*  11/2010  Ozeki .................... G06F 3/044
                                                    345/174

(Continued)

FOREIGN PATENT DOCUMENTS

CN       1447156 A     10/2003
CN     101446721 A      6/2009
CN     103455205 A     12/2013
(Continued)

*Primary Examiner* — Matthew Yeung
(74) *Attorney, Agent, or Firm* — Kilpatrick Townsend & Stockton LLP (57) ABSTRACT

An array substrate, a touch display panel and a display apparatus are provided. The array substrate can include: a substrate, and a plurality of gate lines and data lines defining pixel units. The pixel units can include a first pixel unit, which can include a first insulating layer including at least a first via hole; at least a common electrode and at least a pixel electrode provided at both sides of the first insulating layer, respectively; and at least a first transparent connection block provided in the same layer with the pixel electrodes. Each of the first transparent connection blocks can be connected to the common electrode via the first via hole. The first pixel unit can also include at least a touch metal line provided in the same layer with the pixel electrodes. Each of the touch metal lines can electrically connected to each of the first transparent connection blocks.

12 Claims, 14 Drawing Sheets

(56) References Cited

U.S. PATENT DOCUMENTS

2012/0038585 A1* 2/2012 Kim ............... G06F 3/0412
345/174
2013/0257794 A1* 10/2013 Lee ............... G06F 3/041
345/174

FOREIGN PATENT DOCUMENTS

| CN | 103713792 A | 4/2014 |
| CN | 104022127 A | 9/2014 |
| CN | 103021939 B | 1/2015 |

* cited by examiner

ARRAY SUBSTRATE, TOUCH DISPLAY PANEL AND DISPLAY APPARATUS

CROSS-REFERENCE TO RELATED APPLICATIONS

This application is based upon and claims priority to Chinese Patent Application 201510166454.0, filed on Apr. 9, 2015, the entire contents of which are incorporated herein by reference.

TECHNICAL FIELD

The present disclosure generally relates to the field of touch display, and more particularly, to an array substrate, a touch display panel and a display apparatus.

BACKGROUND

Nowadays, with the increasing development of display technologies, it is desired that a display apparatus has a touch function in addition to an image display function. Presently, touch display apparatuses such as mobile phones, tablet computers and touch display panels are popular. In order to be slimmer, the current touch display apparatus generally integrates touch electrodes onto display panels such as color film substrates, array substrates, organic light emitting panels and the like.

A pixel structure of the built-in touch screen in the prior art generally includes a pixel electrode, a common electrode, an insulation layer and a touch wiring. Specifically, the pixel electrode is provided at one side of the insulation layer, the common electrode is provided at the other side of the insulation layer, and the touch wiring and the pixel electrode are provided in the same layer. The touch wiring is connected to the common electrode directly via a via hole in the insulation layer, and the touch wiring provides touch driving sensing signals when a touch event occurs. However, as the touch wiring has a certain degree of light reflection, when light incident from the backlight irradiates on the touch wiring in the via hole and is reflected by touch wiring, it may further irradiate on a source electrode. The source electrode is generally formed of metal which may further reflect light emitted at a side of a gate line and cause light leakage, which introduces deteriorations of pattern visibility and affects user experience.

SUMMARY

Embodiments of the present disclosure provide an array substrate that can include a substrate, and a plurality of gate lines and a plurality of data lines. The gate lines and the data lines are intersected and insulated to define a plurality of pixel units. The pixel units can include a first pixel unit which can include a first insulating layer comprising at least a first via hole, at least a common electrode provided at one side of the first insulating layer, and at least a pixel electrode provided at the other side of the first insulation layer. The pixel units can also include at least a first transparent connection block provided in the same layer with the pixel electrodes. Each of the first transparent connection blocks can be connected to the common electrode via the first via hole. The pixel units can further include at least a touch metal line provided in the same layer with the pixel electrodes. Each of the touch metal lines can be electrically connected to each of the first transparent connection blocks.

Embodiments of the present disclosure further provide a touch display panel including an array substrate provided by embodiments of the present disclosure; an opposite substrate provided opposite to the array substrate; and a liquid crystal layer provided between the array substrate and the opposite substrate.

Embodiments of the present disclosure further provide a display apparatus including the touch display panel provided by embodiments of the present disclosure.

DETAILED DESCRIPTION

Hereinafter, detailed embodiments of the present disclosure are described in detail with reference to the drawings such that the above objects, features and advantages of the present disclosure are more apparent.

Many specific details are set forth in the following description to fully understand the present disclosure. However, the present disclosure may be implemented in other ways different from those described herein, which is not limited to the specific embodiments disclosed hereinafter.

Figure 1:
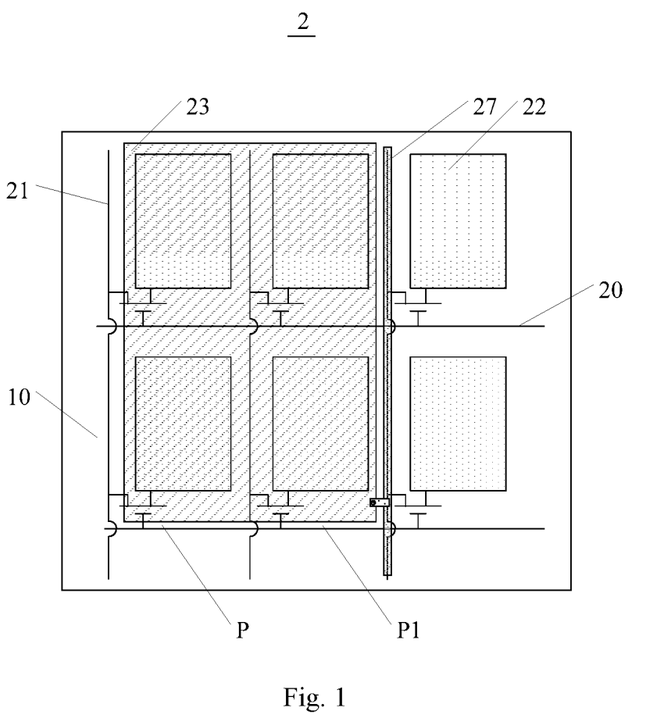
FIG. 1 is a plan view of the array substrate provided by embodiments of the present disclosure.

As illustrated in FIG. 1, the embodiment of the present disclosure provides an array substrate 2 including a substrate 10, a plurality of gate lines 20 and a plurality of data lines 21. The plurality of gate lines 20 and the plurality of data lines 21 are intersected and insulated to define a plurality of pixel units P. The pixel units P include at least a first pixel unit P1 and a second pixel unit P2. The substrate 10 further includes at least a touch metal line 27.

In the embodiments of the present disclosure, common electrodes may be provided between the pixel electrode and the substrate, and may also be provided at a side of the pixel electrode away from the substrate. Firstly, embodiments of the present disclosure disclose a structure in which the common electrode may be provided between the pixel electrode and the substrate.

Figure 2A:
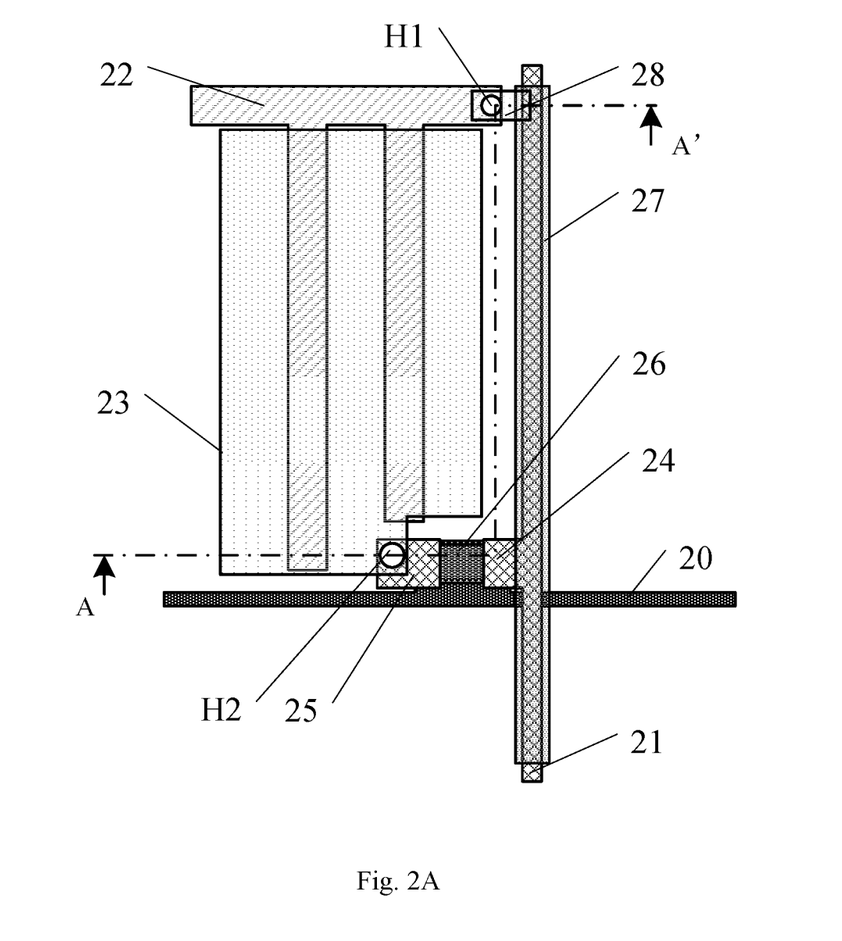
FIG. 2A is a plan view of the first pixel of the array substrate provided by embodiments of the present disclosure.
Figure 2B:
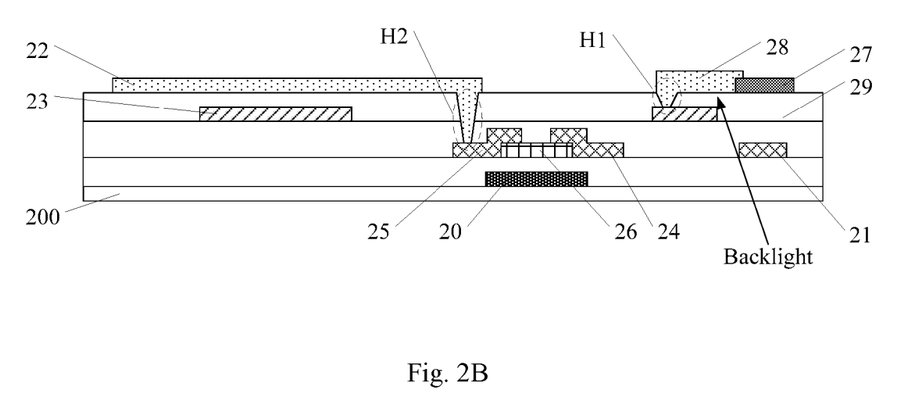
FIG. 2B is a cross sectional view taken along AA' of FIG. 2A.

FIGS. 2A and 2B illustrate a plan view and a cross sectional view of the first pixel unit P1. As illustrated in FIG. 2A, the first pixel unit P1 can include a first insulating layer 29 including at least a first via hole H1, at least a common electrode provided at one side of the first insulating layer, and at least a pixel electrode provided at the other side of the first insulation layer. The first pixel unit P1 can also include at least a first transparent connection block 28 provided in the same layer with the pixel electrode 22, and each of the first transparent connection blocks 28 can be connected to the common electrode 23 via the first via hole H1. It can be further seen form FIG. 2B that each of the first transparent connection blocks 28 can be electrically connected to each of the touch metal lines 27, and the touch metal line 27 can be provided in the same layer with the pixel electrode 22 and overlaps the data line 21.

FIG. 2A further illustrates a source electrode 24, a drain electrode 25 and a semiconductor 26 between the source/drain electrode and the gate electrode, which form a thin film transistor (TFT), and the pixel electrode 22 and drain electrode 25 are electrically connected via the second via hole H2.

Referring to FIG. 2B, when the backlight irradiates towards the direction of the data line 21 along the substrate 10, it may irradiate the first transparent connection block 28 and the first via hole H1. As the first transparent connection block 28 is transparent and the touch metal line 27 does not cover the first via hole H1, the backlight is not reflected by the touch metal line 27, instead, it is transmitted towards a direction away from the substrate 10 from the first transparent connection block 28. The transmitted light is blocked near the data line by a black matrix (not illustrated) shielding the data line, thereby avoiding the pattern visibility.

In addition, the first transparent connection block 28 is provided in the same layer with the pixel electrode and is formed with the same material with the pixel electrode, which may be formed and etched together with the electrode electrodes and does not introduce additional masks or etching steps. That is, no process costs or process steps is increased.

In the array substrate provided by the present disclosure, by connecting the touch metal line 27 and the common electrode 23 with the first transparent connection block 28, it eliminates a backlight reflection form the touch metal line 27 at a connection portion, and solves a problem of pattern visibility due to the touch metal line 27 reflecting the backlight without increasing additional process steps.

Figure 3A:
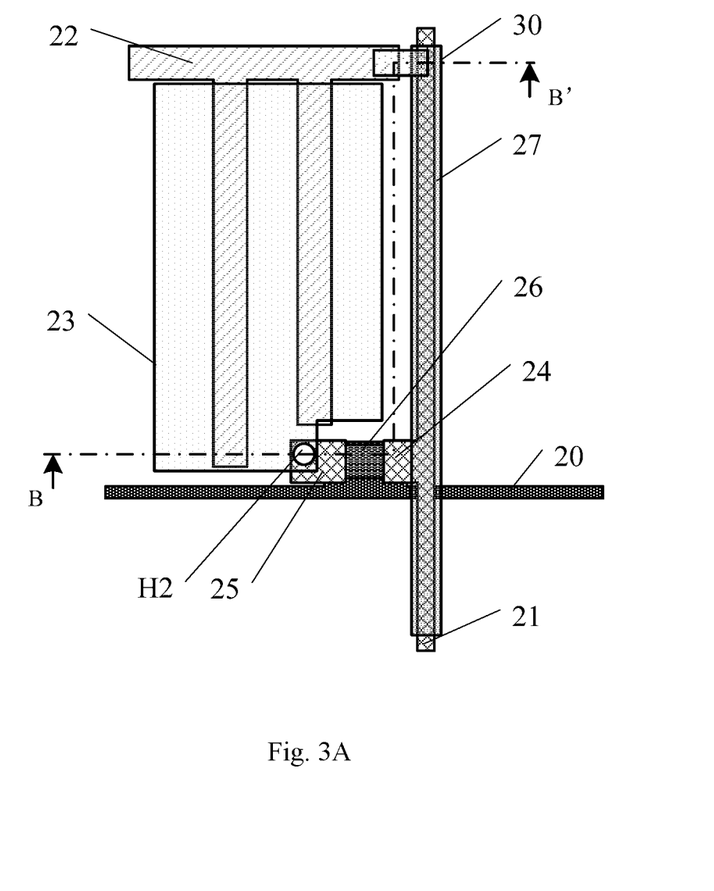
FIG. 3A is a plan view of the second pixel of the array substrate provided by embodiments of the present disclosure.
Figure 3B:
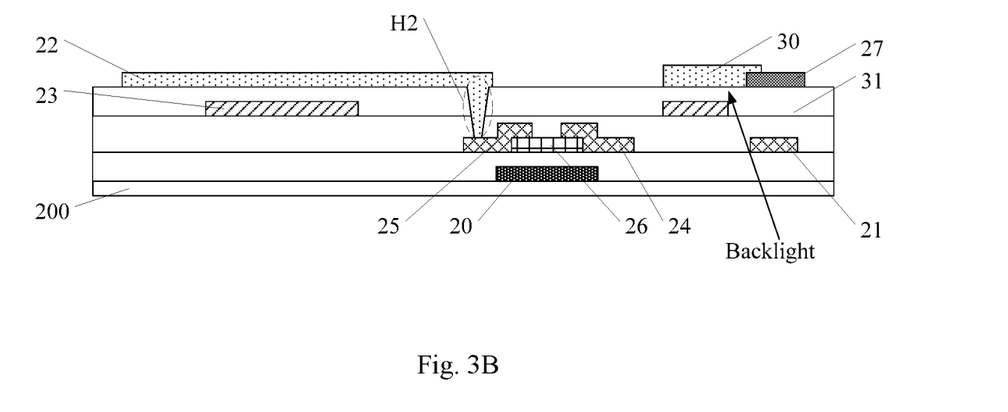
FIG. 3B is a cross sectional view taken along BB' of FIG. 3A.

The array substrate 2 provided by the embodiments of the present disclosure further includes a second pixel unit, and a plan view and a cross sectional view of which are illustrated in FIG. 3A and 3B. As illustrated in FIG. 3A, the second pixel unit includes a second insulation layer 31, at least a common electrode 23 provided at one side of the second insulating layer 31, and at least a pixel electrode 22 provided at the other side of the second insulation layer 31. The second pixel unit can also include at least a second transparent connection block 30 provided in the same layer with the pixel electrode 22 and can be electrically connected to one touch metal line 27.

As illustrated in FIG. 3B, in certain embodiments, as in this embodiment, a via hole that electrically connects the second transparent connection block 30 to the common electrode 23 does not need to be provided in the second insulation layer 31, and the second transparent connection block 30 can be insulated from the common electrode 23 of the second pixel unit. That is, the touch metal line 27 can be insulated from the common electrode 23 of the second pixel unit, such that the touch metal line 27 can be electrically connected to the common electrode 23 in the first pixel unit via the first transparent connection block 28 in the first pixel unit. That is, the common electrode 23 in the first pixel unit is in one to one correspondence with the touch metal line.

Referring to FIG. 3B, the second transparent connection block 30 can be provided at a position of the second pixel unit that is close to the position of the first pixel unit at which the first transparent connection block 28 is provided, i.e., the connection portion of the touch metal line 27. In addition, the second transparent connection block 30 and the first transparent connection block can be provided in the same layer and can be the same in shape and material, and the second insulating layer 31 and the first insulation layer are provided in the same layer and are the same in material.

In the array substrate provided in the present disclosure, the second transparent connection block 30 is formed of the same shape and same material with those of the first transparent connection block, and is provided at the same position of the second pixel unit corresponding to that of the first pixel unit, a visual illusion may be generated to prevent visibility of human eyes due to the difference in transparency.

Further, the second transparent connection block 30 covers the touch metal line 27 at a connection portion with the touch metal line 27. Similar to the function of the first transparent connection block 28 covering the touch metal line 27 at a connection portion with the touch metal line 27, this may protect the touch metal line 27 at the connection portion, and additionally may avoid visual difference.

Figure 4A:
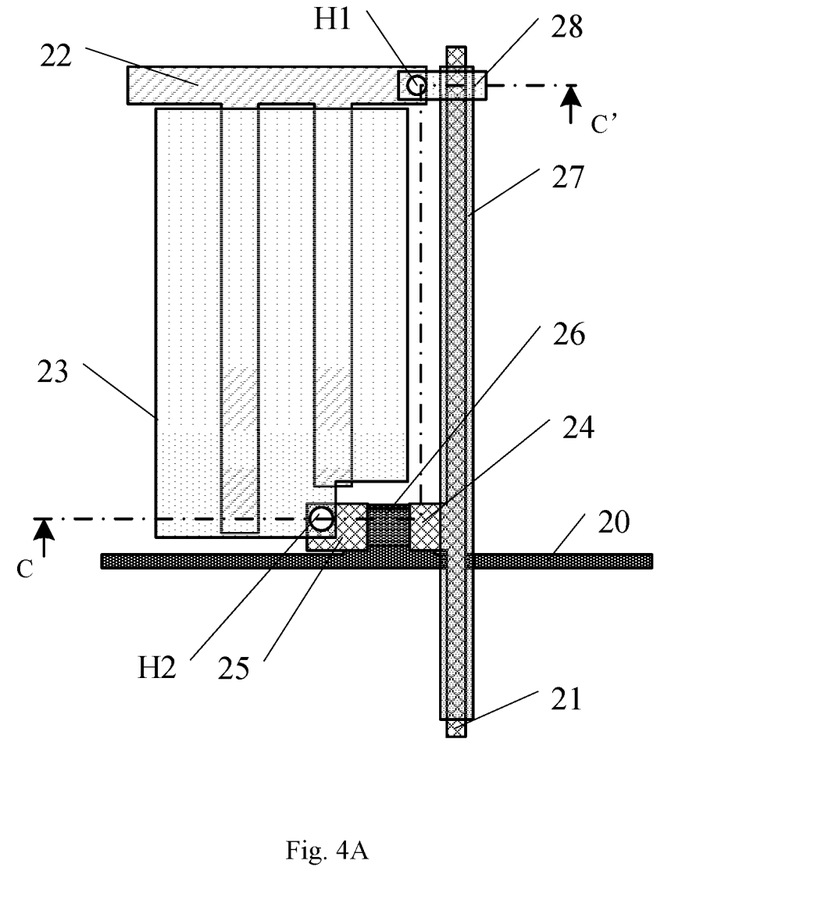
FIG. 4A is a plan view of the first pixel of another array substrate provided by embodiments of the present disclosure.

Embodiments of the present disclosure further provide another array substrates having a first pixel unit as illustrated in FIG. 4A, which includes a first insulation layer 29, a common electrode 23, a pixel electrode 22, a source electrode 24, a drain electrode 25, a semiconductor 26 between the source/drain electrode and the gate electrode, and a first transparent connection block 28. The first transparent connection block 28 covers the touch metal line 27 at a connection portion with the touch metal line 27.

Figure 4B:
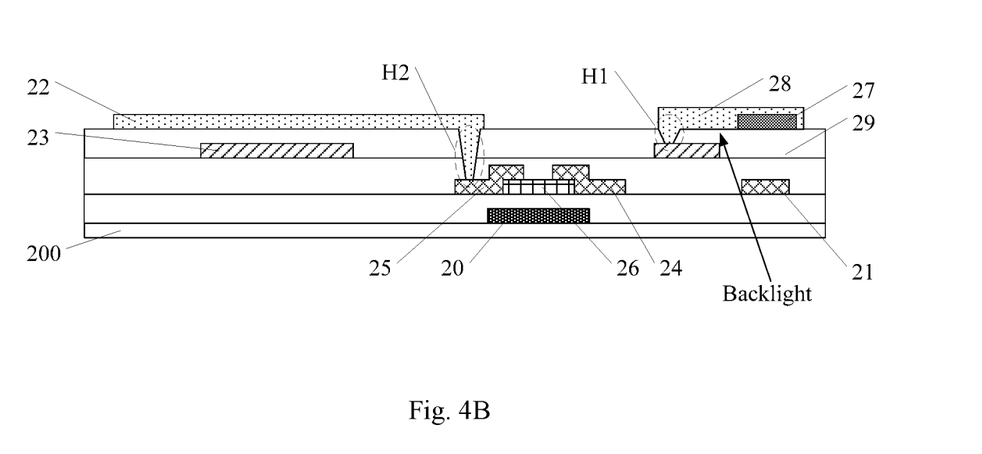
FIG. 4B is a cross sectional view taken along CC' of FIG. 4A.

FIG. 4B illustrates a cross section view of FIG. 4A. As illustrated in FIG. 4B, the first transparent connection block 28 and the pixel electrode 22 can be provided in the same layer, and each of the first transparent connection blocks 28 can be connected to the common electrode 23 via the first via hole H1. Each of the first transparent connection blocks 28 can be electrically connected to each of the first touch metal lines 27. The touch metal line 27 can be provided in the same layer with the pixel electrode 22, and the touch metal line 27 can overlap the data line 21.

Referring to FIG. 4B, when the first transparent connection block 28 covers the touch metal line 27, an electrical connection area with the touch metal line 27 can be further increased. This can increase the conductivity. In addition, the first transparent connection block 28 can cover the touch metal line 27. This can effectively protect the touch metal line 27 at the connection portion, prevent metal corrosion at the connection portion, and further increase stability of the electrical connection. Meanwhile, as the first transparent connection block 28 is used to connect the common electrode 23 and the touch metal line 27, it can have advantages of preventing backlight reflection and avoiding pattern visibility.

Figure 5:
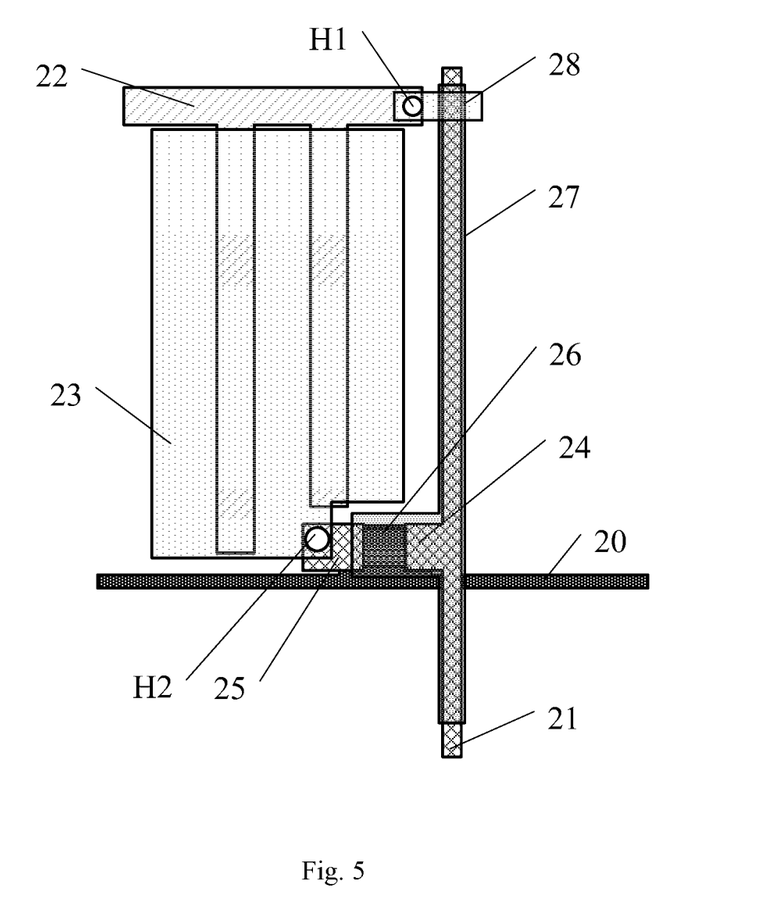
FIG. 5 is a plan view of the first pixel of another array substrate provided by embodiments of the present disclosure.

Embodiments of the present disclosure further provide another array substrate having a first pixel unit with the plan view as illustrated in FIG. 5. As shown, the first pixel unit can further include a gate electrode 20, a source electrode 24, a drain electrode 25 and a semiconductor 26, and the pixel electrode 22 can be electrically connected to the drain electrode 25 via the second via hole H2. The gate electrode 20 can overlap the source electrode 24, the drain electrode 25 and the semiconductor 26 to form a channel. The touch metal line 27 includes an extension portion that covers the channel.

In the array substrate provided by the embodiments of the present disclosure, by extending a portion of the touch metal line 27 to cover the channel, it may prevent the ambient light incident from the pixel electrode side from affecting the channel or the performance of the switching device (TFT), such that the performance of the panel is more stable.

Figure 6A:
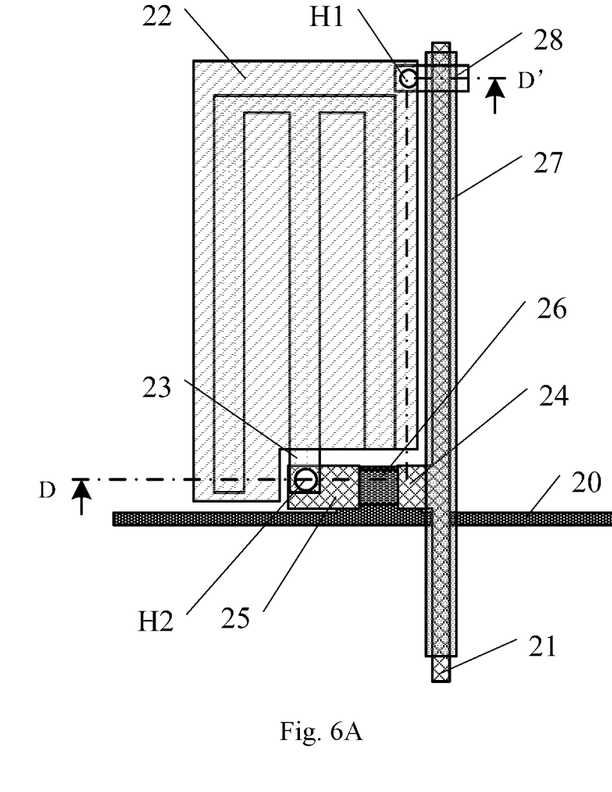
FIG. 6A is a plan view of the first pixel of another array substrate provided by embodiments of the present disclosure.
Figure 6B:
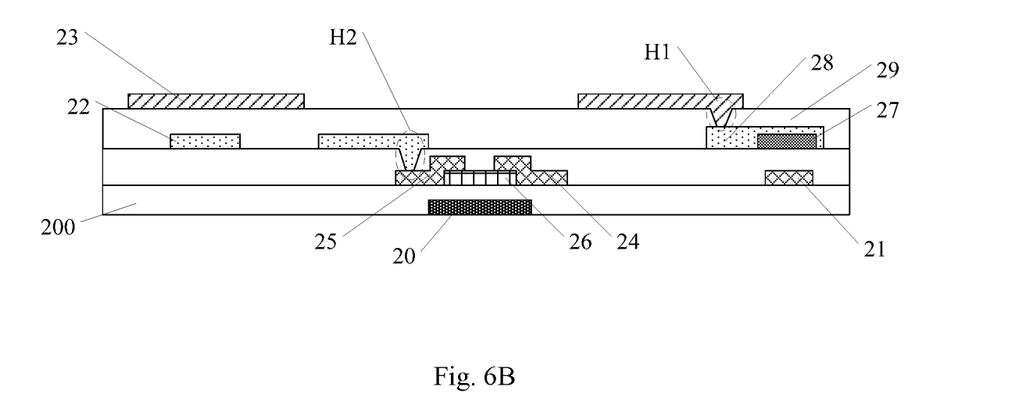
FIG. 6B is a cross sectional view taken along DD' of FIG. 6A.

In the above embodiments, an example in which the common electrode 23 is provided between the pixel electrode 22 and the substrate 10 is described, and embodiments of the present disclosure further include a situation in which the pixel electrode 22 is provided between the common electrode 23 and the substrate 10. In addition, in the pixel unit of the above embodiment, the common electrode 23 includes bar shaped sub electrodes, and embodiments of the present disclosure may also have pixel electrode 22 including bar shaped electrodes. As illustrated in FIGS. 6A and 6B, the pixel electrode 22 includes bar shaped sub electrodes and is provided between the common electrode 23 and the substrate 10. The first transparent connection block 28 and the pixel electrode 22 are provided in the same layer and cover the touch electrode line 27 at the connection portion, and the common electrode 22 is electrically connected to the first transparent connection block 28 via the first via hole H1.

Figure 7:
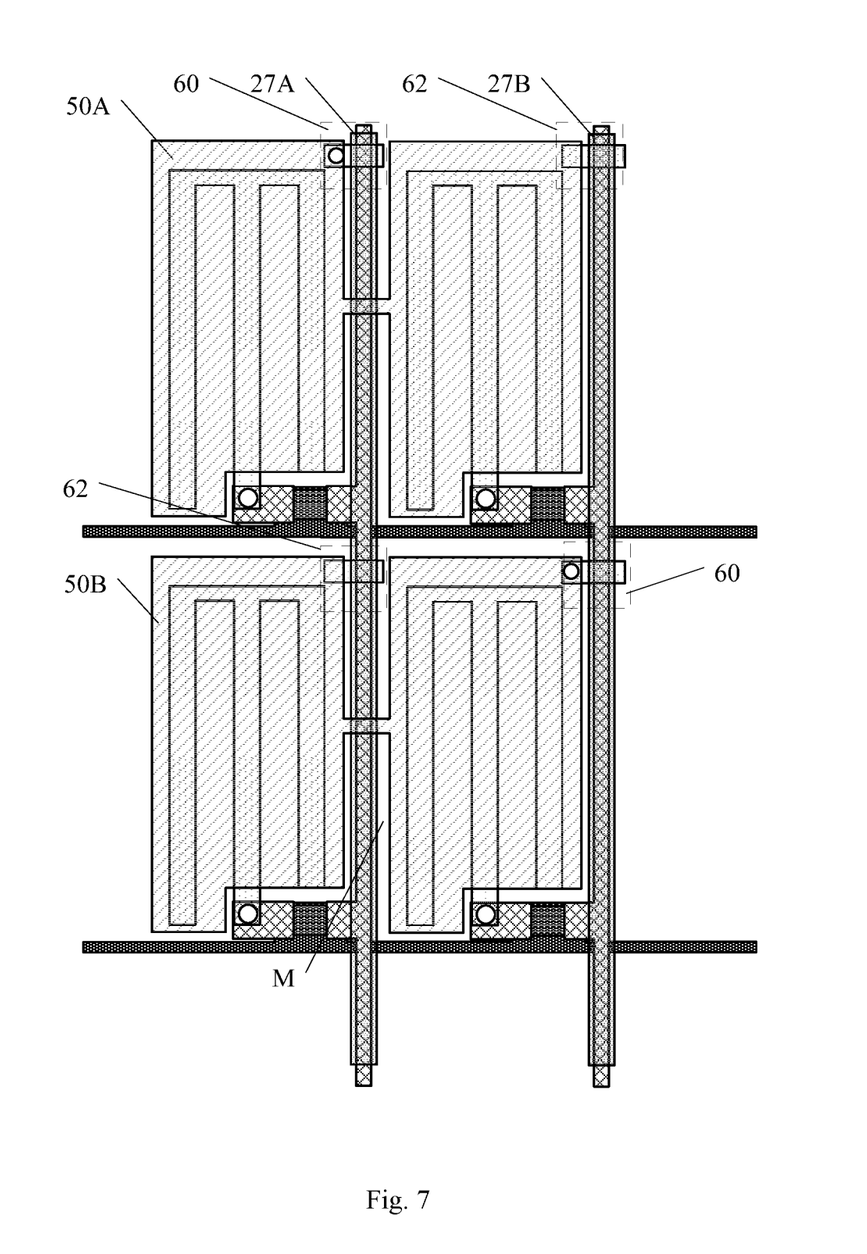
FIG. 7 is a plan view of another array substrate provided by the embodiments of the present disclosure.

In the array substrate provided by the embodiments of the present disclosure, common electrodes may be electrically connected into common electrode blocks to correspond to the plurality of pixel units, and each of the common electrode blocks is electrically connected to each of the touch metal lines via each of the first transparent connection blocks. As illustrated in FIG. 7, the common electrodes can be electrically connected into common electrode blocks 50A and 50B. With respect to the common electrode block 50A, it can be electrically connected only to the touch metal line 27A, and hence at the connection portion 60, the common electrode block 50A can be electrically connected to the first transparent connection block via the first via hole and in turn is connected to the touch metal line 27A. However, at the insulation portion 62, the first via hole that electrically connects the common electrode block 50A to the second transparent connection block may not be provided, and thus the common electrode block 50A can be insulated from the touch metal line 27B.

Likewise, with respect to the common electrode block 50B, it can be electrically connected only to the touch metal line 27B, and hence at the connection portion 60, the common electrode block 50B can be electrically connected to the first transparent connection block via the first via hole and in turn is connected to the touch metal line 27B. However, at the insulation portion 62, the first via hole that electrically connects the common electrode block 50A to the second transparent connection block may not be provided, and thus the common electrode block 50B is insulated from the touch metal line 27A.

Further, the common electrode 23 includes a plurality of slits M that overlap the touch metal line 27. The advantages for providing slits of the common electrode 23 overlapping the touch electrode line 27 lie in: while performing touch driving and touch detection, coupling capacitance between the touch electrode line 27 and the common electrode 23 may be decreased, and thereby the load of the touch electrode line 27 may be lowered.

In the array substrate provided by the embodiments of the present disclosure, since the first transparent connection block is provided to electrically connect the touch metal line to the common electrode block, it may prevent a display defect due to the backlight reflection when the touch metal line is provided in the first via hole. In addition, the second transparent may be provided to generate a visual illusion to further improve display effect. Further, the extension portion of the touch metal line may be used to shield the channel, thereby improving stability of the display.

Figure 8A:
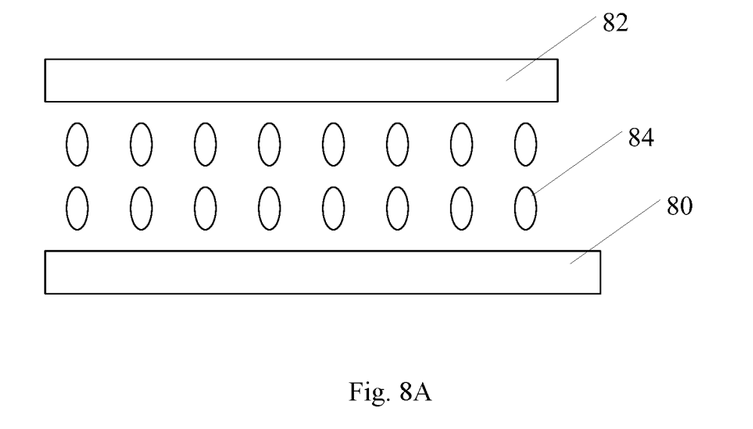
FIG. 8A is a schematic diagram of the layers of the touch display panel provided by the embodiments of the present disclosure.

Embodiments of the present disclosure further provides a touch display panel which, as illustrated in FIG. 8A, includes any one of the array substrates 80 provided by the embodiments of the present disclosure, an opposite substrate 82 provided opposite to the array substrate 80, and a liquid crystal layer 84 provided between the array substrate 80 and the opposite substrate 82. A black matrix (not illustrated) is provided on the opposite substrate 82, which may shield opaque regions such as the gate line, the data line, the channel and the like.

Figure 8B:
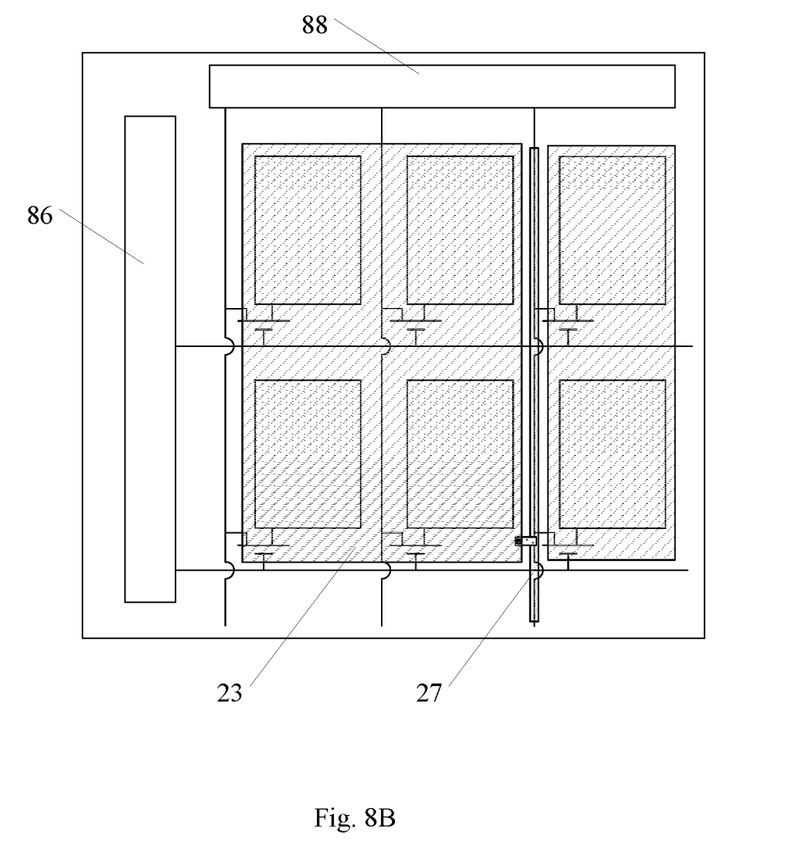
FIG. 8B is a plan view of the touch display panel provided by the embodiments of the present disclosure.

As illustrated in FIG. 8B, the array substrate 80 can further include a common electrode 23 and a touch metal line 27, and the touch metal line 27 can be connected to a common electrical level while performing display and is connected to a touch driving signal and a touch detection signal while performing touch. In addition, the array substrate 80 further includes a gate driving circuit 86 and a data driving circuit 88, which are connected to the display signals while performing display.

Figure 9:
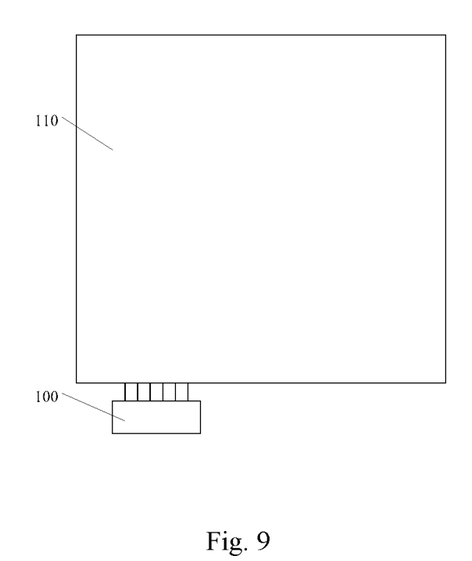
FIG. 9 is a schematic diagram of the display apparatus provided by the embodiments of the present disclosure.

Embodiments of the present disclosure further provides a display apparatus which, as illustrated in FIG. 9, can include a chip 100 and any one of the display panels 110 provided by the embodiments of the present disclosure. The chip 100 may be a display touch integrated chip, which may provide display signals such as gate circuit control signal and data circuit control signal during the phase of display, and may further provide touch driving signals and touch detection signals during the phase of touch. The touch driving signals may be square waves or sine waves that are provided to each of the common electrodes serving as touch electrode via each of the touch electrode lines, and the touch driving signals may detect changes of capacitance or voltage on each of the common electrodes, thereby to obtain the touch coordinate.

In the display panel and the display apparatus provided by the embodiments of the present disclosure, since the array substrate provided by the embodiments of the present disclosure is used, it may also have advantages of preventing display defect due to backlight reflection form the touch metal line at the first via hole, and may further improve display effect and stability of the display panel or the display apparatus.

It should be noted that the above embodiments may be combined and merit from one another. Although the present disclosure has been disclosed in the preferred embodiments above, they are not intended to limit the present disclosure.

Any skilled in the art may make changes and modifications to the technical solution of the present disclosure using the above disclosed method and technical content within the spirit and scope of the present disclosure. Accordingly, all content without departing from the technical solution of the present discourse and all simple changes, equivalents and modifications fall within the scope of the technical solution of the present disclosure.

What is claimed is:

1. An array substrate, comprising:
a substrate having a lower side and an upper side;
a plurality of gate lines and a plurality of data lines, the gate lines and the data lines intersecting and insulating with each other to form a plurality of pixel units on the upper side of the substrate, wherein the pixel units comprise a first pixel unit comprising:
a first insulating layer comprising at least a first via hole;
at least a common electrode provided at one side of the first insulating layer, and at least a pixel electrode provided at the other side of the first insulation layer; and
at least a first transparent connection block provided in the same layer with the pixel electrodes, and each of the first transparent connection blocks is connected to the common electrode via the first via hole; and
at least a touch metal line provided in the same layer with the pixel electrodes, each of the touch metal lines being electrically connected to each of the first transparent connection blocks,
wherein the common electrode is provided between the pixel electrode and the substrate, and the touch metal line does not overlap the first via hole, and light incident from the lower side of the substrate passes through the first via hole without being reflected by the touch metal line electrically connected to the first via hole via the first transparent connection block.

2. The array substrate according to claim 1, wherein the plurality of common electrodes in the plurality of first pixel units are electrically connected to one another to form common electrode blocks, the common electrode blocks are insulated from one another, and each of the common electrode blocks is electrically connected to each of the touch metal lines via each of the first transparent connection blocks.

3. The array substrate according to claim 1, wherein the first transparent connection block covers the touch metal line at a connection portion with the touch metal line.

4. The array substrate according to claim 1, wherein the touch metal line overlaps the data line.

5. The array substrate according to claim 1, wherein the pixel unit further comprises a second pixel unit comprising:
a second insulation layer provided in the same layer and formed of the same material with the first insulation layer;
at least a common electrode provided at one side of the second insulating layer, and at least a pixel electrode provided at the other side of the insulation layer; and
at least a second transparent connection block provided in the same layer with the pixel electrode and electrically connected to one touch metal line, the second transparent connection block being provided in the same layer and has the same shape and material with the first transparent connection block.

6. The array substrate according to claim 5, wherein the second transparent connection block covers the touch metal line at a connection portion with the touch metal line.

7. The array substrate according to claim 1, wherein the first pixel unit further comprises a gate electrode, a source electrode, a drain electrode and a channel, and the pixel electrode is electrically connected to the drain electrode via a second via hole.

8. The array substrate according to claim 7, wherein the touch metal line comprises an extension portion that covers the channel.

9. The array substrate according to claim 1, wherein the common electrode comprises a plurality of slits that overlap the touch metal line.

10. A touch display panel comprising:
an array substrate according to claim 1;
an opposite substrate provided opposite to the array substrate; and
a liquid crystal layer provided between the array substrate and the opposite substrate.

11. The touch display panel according to claim 10, wherein the touch metal line is connected to a common electrical level while performing display and the touch metal line is connected to a touch driving signal or a touch detection signal while performing touch.

12. A display apparatus comprising a touch display panel according to claim 10.

* * * * *